US011624754B2

(12) United States Patent
Hayes et al.

(10) Patent No.: US 11,624,754 B2
(45) Date of Patent: Apr. 11, 2023

(54) SENSOR TEMPERATURE SENSING (71) Applicant: Bendix Commercial Vehicle Systems LLC, Elyria, OH (US)

(72) Inventors: Thomas J. Hayes, Lakewood, OH (US); Nianqing Zhou, Avon, OH (US); Michael D. Cremona, Lakewood, OH (US); Steven C. Schapel, Akron, OH (US); Timothy J. Frashure, Columbia Station, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 250 days.

(21) Appl. No.: 16/953,421

(22) Filed: Nov. 20, 2020

(65) Prior Publication Data

US 2022/0163554 A1 May 26, 2022

(51) Int. Cl.
*G01K 7/22* (2006.01)
*G01P 3/481* (2006.01)
*G01P 1/02* (2006.01)

(52) U.S. Cl.
CPC .............. *G01P 3/481* (2013.01); *G01K 7/22* (2013.01); *G01P 1/026* (2013.01)

(58) Field of Classification Search
CPC .......... G01P 3/481; G01P 1/026; G01P 3/487; G01K 7/22; G01K 3/005; G01K 7/24; G01K 7/16; G01D 3/0365; G01D 21/02
See application file for complete search history.

(56) References Cited

U.S. PATENT DOCUMENTS

| 5,381,090 A | 1/1995 | Adler et al. |
| 10,288,492 B2 * | 5/2019 | Arwatz ................. G01K 1/18 |

(Continued)

FOREIGN PATENT DOCUMENTS

| CN | 204330798 U | 5/2015 |
| DE | 4431045 A1 | 3/1996 |

(Continued)

OTHER PUBLICATIONS

Partial International Search Report issued in corresponding International (PCT) Patent Application No. PCT/US2021/058960 (dated Feb. 24, 2022).
Provisional Opinion issued in corresponding International (PCT) Patent Application No. PCT/US2021/058960 (dated Feb. 24, 2022).

(Continued)

*Primary Examiner* — Christopher P McAndrew
*Assistant Examiner* — Zannatul Ferdous
(74) *Attorney, Agent, or Firm* — Reising Ethington P.C.

(57) ABSTRACT

Sensor assemblies incorporating a temperature varying resistor provide information regarding the temperature of the operating environment for a sensor or protect the sensor from extreme temperatures. The assembly includes only two conductors—one transmitting current from a power source and another transmitting an output signal. In one embodiment, the assembly includes a sensor and a temperature varying resistor in parallel between the conductors with the output signal including information regarding a value of a variable measured by the sensor and information regarding a temperature of an operating environment for the sensor. In another embodiment, the sensor and temperature varying resistor are in series between the conductors with the output signal including information regarding a value of a variable measured by the sensor and the temperature varying resistor preventing delivery of current to the sensor when a temperature of the operating environment for the sensor meets a predetermined condition.

18 Claims, 6 Drawing Sheets

(56) References Cited

U.S. PATENT DOCUMENTS

| | | | | |
|---|---|---|---|---|
| 10,856,452 | B1 * | 12/2020 | Fiori, Jr. ................ | G01D 5/202 |
| 2009/0138241 | A1 * | 5/2009 | Parachini ............... | G01K 1/026 |
| | | | | 702/188 |
| 2009/0304043 | A1 | 12/2009 | Glehr et al. | |
| 2020/0326210 | A1 * | 10/2020 | Creech ................. | G01D 5/2066 |
| 2020/0339105 | A1 * | 10/2020 | Kluftinger ............ | B60W 30/02 |

FOREIGN PATENT DOCUMENTS

| | | |
|---|---|---|
| GB | 2070776 A | 9/1981 |
| WO | 2004/027433 A1 | 4/2004 |

OTHER PUBLICATIONS

English (machine) translation of CN 204330798 U.
English (machine) translation of WO 2004/027433 A1.

\* cited by examiner

SENSOR TEMPERATURE SENSING

BACKGROUND OF THE INVENTION a. Field of the Invention

This invention relates to a sensor assembly. In particular, the invention relates to a sensor assembly in which a temperature reactive device, such as a thermistor or resistance temperature detector (RTD), is used to measure the temperature of the operating environment for a sensor and either provide information about the temperature with information from the sensor in a common output signal or control delivery of current to the sensor.

b. Background Art

Sensors are used in a wide variety of applications to measure a variety of variables. In vehicles, for example, wheel speed sensors are used monitor the speed and direction of travel of the vehicle for a variety of purposes including control of vehicle braking and vehicle stability. Vehicles frequently employ wheel speed sensors proximate some or all of the vehicle wheels to monitor the speed and direction of rotation of the wheels and provide this information to brake control systems, stability control systems and other vehicle systems. Each sensor is mounted in a rotationally fixed position opposite a tone wheel that is mounted to, and rotates with, a corresponding vehicle wheel. The wheel speed sensors may be passive sensors in which rotation of the tone wheel induces an alternating current in the sensor or active sensors in which rotation of the tone wheel modulates a pre-existing current in the sensor. Passive sensors have a low signal to noise output at low speeds because the slow rotation of the tone wheel does not induce a sufficiently strong current. Passive sensors are also unable to provide information regarding the direction of rotation. For these reasons, active sensors are often preferred in modern vehicles with advanced braking and stability control systems. Active sensors, however, are more sensitive than passive sensors with respect to temperatures. In certain applications excessive temperatures can negatively impact the operation of the sensors or even damage the sensors. Wheel speed sensors, for example, operate in an environment in which relatively high temperatures are often generated during braking of the vehicle wheels leading to potential damage to the sensors. For these reasons, sensors often incorporate a temperature sensor to monitor the temperature. Some sensors, however, only include two wires. In order to convey information from the temperature sensor, the transmission of information from the primary sensor measuring the variable that is of interest must be interrupted. In many applications, interrupting the flow of information regarding the measured variable may have significant implications. In wheel speed sensors, for example, interrupting the flow of information regarding wheel speed in order to convey information regarding temperature may inhibit proper operation of anti-lock braking systems (ABS) during an ABS event. Further, the controller must include additional hardware to request, receive and interpret the temperature information.

The inventors herein have recognized a need for a sensor assembly that will minimize and/or eliminate one or more of the above-identified deficiencies.

BRIEF SUMMARY OF THE INVENTION

This invention relates to a sensor assembly. In particular, the invention relates to a sensor assembly in which a temperature reactive device, such as a thermistor or resistance temperature detector (RTD), is used to measure the temperature of the operating environment for a sensor and either provide information about the temperature with information from the sensor in a common output signal or control delivery of current to the sensor.

A sensor assembly in accordance with one embodiment includes a sensor and a temperature varying resistor in parallel with the sensor. The sensor assembly includes only first and second conductors. The first conductor is configured to transmit current from a power source and the second conductor is configured to transmit an output signal. The sensor and the temperature varying resistor are in parallel between the first and second conductors and the output signal of the sensor assembly includes information regarding a value of a variable measured by the sensor and information regarding a temperature of an operating environment for the sensor.

A sensor assembly in accordance with another embodiment includes a sensor and means, in parallel with the sensor, for measuring a temperature of an operating environment for the sensor. The sensor assembly includes only first and second conductors. The first conductor is configured to transmit current from a power source and the second conductor is configured to transmit an output signal. The sensor and the measuring means are in parallel between the first and second conductors and the output signal of the sensor assembly includes information regarding a value of a variable measured by the sensor and information regarding a temperature of an operating environment for the sensor.

A sensor assembly in accordance with another embodiment includes a sensor and a temperature varying resistor in series with the sensor. The sensor assembly includes only first and second conductors. The first conductor is configured to transmit current from a power source and the second conductor is configured to transmit an output signal. The sensor and the temperature varying resistor are in series between the first and second conductors and the output signal of the sensor assembly includes information regarding a value of a variable measured by the sensor. The temperature varying resistor prevents delivery of current to the sensor from the power source when a temperature of the operating environment for the sensor meets a predetermined condition relative to a predetermined temperature.

A sensor assembly in accordance with present teachings represents an improvement as compared to conventional sensor assemblies. Because the sensor assembly is capable of determining the temperature of the operating environment of the sensor, the sensor assembly facilitates the use of active sensors in applications in which passive sensors have limitations, but in which the potential for relatively high temperatures might otherwise preclude the use of active sensors. In addition, and unlike conventional sensors with temperature sensing capabilities, the sensor assembly enables the transmission and use of temperature information without the need for additional wires or other controller hardware. Further, the sensor assembly enables the transmission of temperature information without interrupting the transmission of information regarding the variable being measured by the primary sensor.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
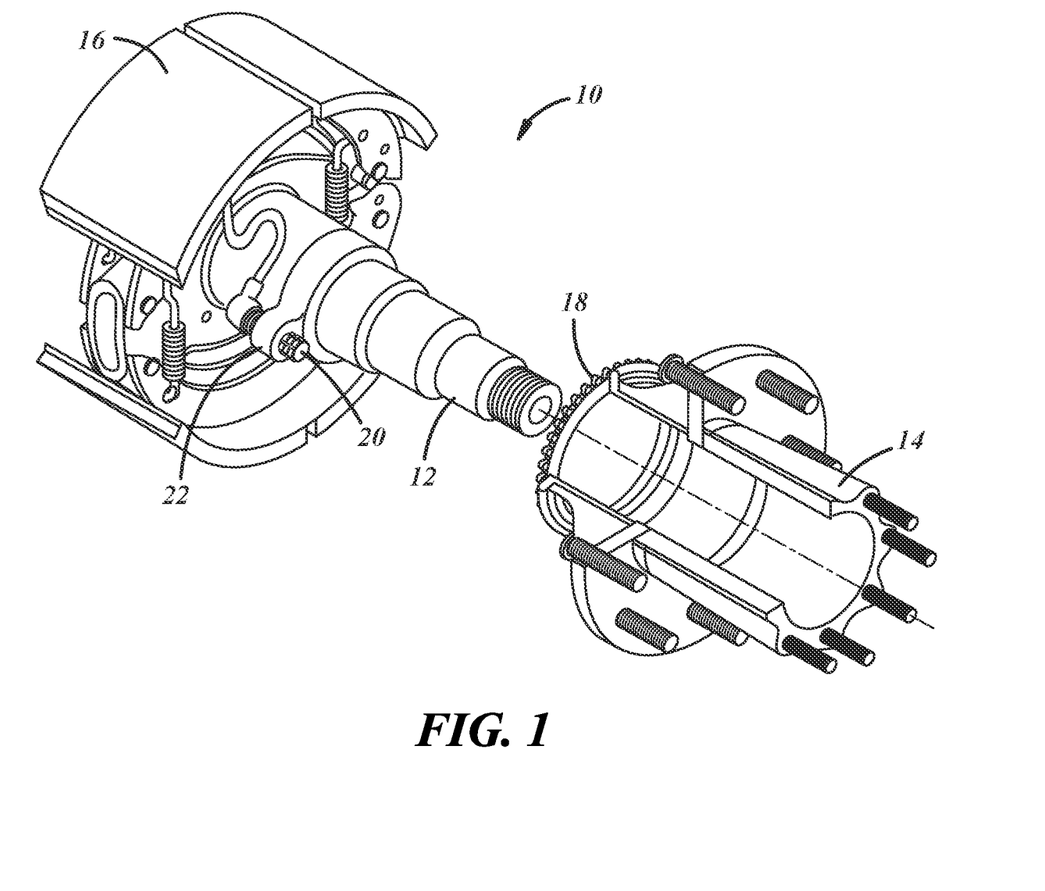
FIG. 1 is a perspective view of a vehicle wheel assembly including a sensor assembly in accordance with one or more embodiments of the present teachings.

Referring now to the drawings wherein like reference numerals are used to identify identical components in the various views, FIG. 1 illustrates a wheel assembly 10 for a vehicle. In certain embodiments, the vehicle may comprise a heavy commercial vehicle and, in particular, a tractor-trailer (also referred to as a semi) containing a tractor or power unit and one or more trailers or towed units. It should be understood, however, that the inventions disclosed herein may find application in other types of commercial vehicles, in non-commercial vehicles and in non-vehicular applications. Assembly 10 includes an axle 12 and a wheel hub 14 that supports a vehicle wheel (not shown). The wheel hub 14 is rotatably supported on axle 12 by wheel bearings (not shown). Assembly 10 may further include a wheel brake 16 configured to apply a braking force to the vehicle wheel. In the illustrated embodiment, brake 16 comprises a drum brake in which a brake actuator causes, responsive to fluid pressure or another force, movement of one or more brake shoes into engagement with a braking surface in a brake drum (not shown) rotating with the vehicle wheel. Alternatively, brake 16 may comprise a disc brake in which a carrier supports brake pads on opposite sides of a rotor rotating with the vehicle wheel and a brake actuator causes, responsive to fluid pressure or another force, movement of a caliper relative to the carrier to move the brake pads into and out of engagement with the rotor. The operation of wheel brake 16 may be controlled by a brake control system (not shown) including a brake actuator, one or more fluid control valves that control the delivery of fluid pressure to the brake actuator and a controller that generates control signals to controls the operation of the fluid control valves in response to various inputs including signals from sensors indicative of the operation of the vehicle and surrounding environment and from user inputs by the vehicle operator.

A vehicle incorporating wheel assembly 10 may further include a system for determining the speed and direction of rotation of the vehicle wheel. Information from the system may be used in a variety of vehicle systems including, but not limited to, the brake control system for brake 16 and stability control systems for the vehicle. The system may include a tone wheel 18, a wheel speed sensor assembly 20, and a controller (not shown).

Tone wheel 18 (sometimes referred to as an "exciter ring" or "tone ring") is configured for rotation with the vehicle wheel and is fixed to wheel hub 14 for rotation with wheel hub 14 and the vehicle wheel. In some embodiments, tone wheel 18 may be formed within, or integrated with, a seal for the bearings supporting the vehicle wheel on wheel hub 14. In some embodiments, tone wheel 18 defines a plurality of radially outwardly extending ferromagnetic teeth and sensor assembly 20 detects and reacts to the presence or absence of the teeth as tone wheel 18 rotates relative to sensor assembly 20. In other embodiments, tone wheel 18 may comprise a magnetic encoder with a plurality of circumferentially arranged magnets of alternating polarity and sensor assembly 20 detects and reacts to the magnets as tone wheel 18 rotates relative to sensor assembly 20.

Figure 2:
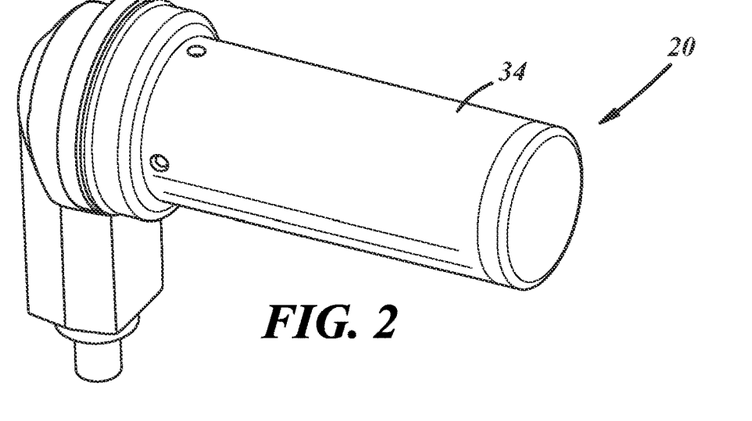
FIG. 2 is a perspective view of the senor assembly of FIG. 1.
Figure 3:
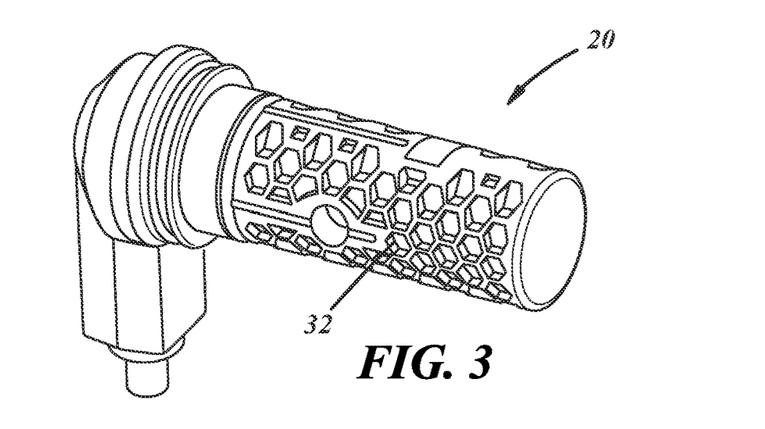
FIGS. 3 and 4 are perspective views of the sensor assembly of FIG. 2 with portions of the sensor assembly removed.
Figure 4:
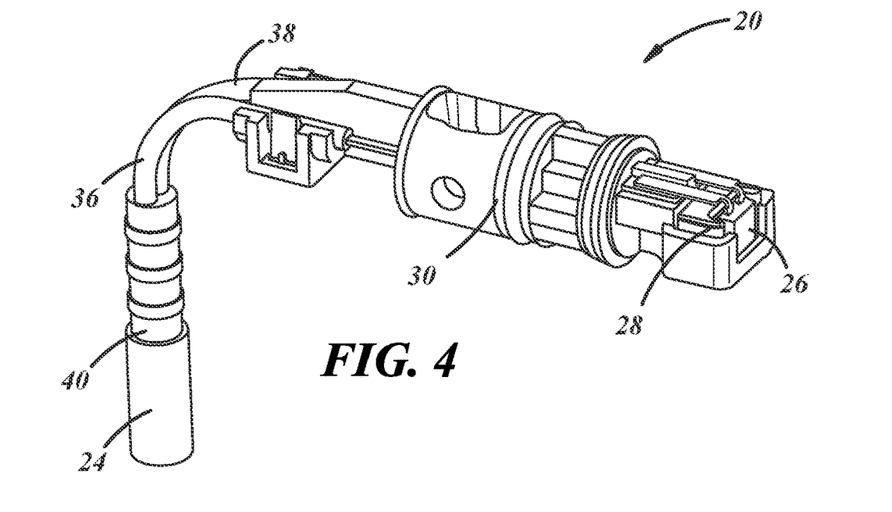

Sensor assembly 20 generates signals indicative of the rotational speed and direction of tone wheel 18 and, therefore, the vehicle wheel, in response to rotation of tone wheel 18 relative to sensor assembly 20. Sensor assembly 20 may be inserted into an opening in a sensor mounting block 22 on axle 12 and thereby positioned relative to tone wheel 18 such that sensor assembly 20 detects rotation of tone wheel 18 relative to sensor assembly 20. Referring to FIGS. 2-4, sensor assembly 20 may include a wire harness 24, an application specific integrated circuit (ASIC) or computing chip 26, a magnet 28, a carrier 30, an overmold 32 and a can or housing 34.

Wire harness 24 is provided to transmit electrical power to chip 26 and signals from chip 26. Wire harness 24 includes two wires or other conductors 36, 38 and a jacket 40 through which the conductors 36, 38 extend. Conductors 36, 38 extend between chip 26 and other circuit elements. One conductor 36 is configured to transmit current from a power source. The other conductor 38 is configured to transmit an output signal of sensor assembly 20 and may be coupled directly to a controller or may be coupled to a connector for a vehicle communication bus (which may be implemented as a controller area network (CAN), a Local Interconnect Network (LIN) or using another communication medium such as power line communication (PLC)). Because wire harness 24 includes only two conductors 36, 38, any attempt to convey temperature information from a conventional temperature sensor as in conventional sensor assemblies requires interruption of the transmission of information regarding the variable of interest from the sensor in sensor assembly 20.

Chip 26 is provided to generate a signal indicative of the value of a measured variable. In the illustrated embodiment, chip 26 generates a signal indicative of the speed and direction of rotation of a vehicle wheel. Chip 26 includes a semiconductor wafer embedded with integrated circuitry. Chip 26 supports either a passive wheel speed sensor in which rotation of tone wheel 18 induces an alternating current in the sensor or an active wheel speed sensor in which current provided by an external power source through wire harness 24 is modulated as a result of changing magnetic resistance occurring in response to movement of tone wheel 18. In addition to the wheel speed sensor, chip 26 may include additional signal processing circuitry to condition the outputs of the sensor.

Magnet 28 is provided to establish a magnetic field in the area proximate chip 26. Rotation of tone wheel 18 causes variation in the magnetic field that may be measured by the sensor on chip 26 to provide an indication of the speed and direction of rotation of the vehicle wheel.

Carrier 30 provides support to, and positions and orients, certain components of sensor assembly 20 including one end of each conductor 36, 38 from wire harness 24, chip 26 and magnet 28. Carrier 30 may be made from polymeric materials. The configuration of carrier 30 may vary depending on the components carried by carrier 30. In the illustrated embodiment, carrier 30 is shaped to receive conductors 36, 38, at one longitudinal end and to guide conductors 36, 38 to chip 26 at an opposite longitudinal end of carrier 30. Carrier 30 also locates magnet 28 on a rear side of chip 26 opposite tone wheel 20.

Overmold 32 is provided to protect the components of sensor assembly 20 including conductors 36, 38 of wire harness 24, chip 26 and magnet 28. Overmold 32 further shapes assembly 20 to allow handling and installation within mounting block 22 (see FIG. 1). Overmold 32 may be formed in a conventional overmolding operating using conventional polymer materials.

Housing 34 is provided for additional protection of the components of sensor assembly 20 and for secure engagement with a mounting sleeve (not shown) in sensor mounting block 22. Housing 34 may be made from stainless steel to inhibit deformation during engagement with the mounting sleeve and to inhibit corrosion. Housing 34 is configured to enclose the terminal ends of conductors 36, 38, chip, 26, magnet 28 and carrier 30.

Figure 5:
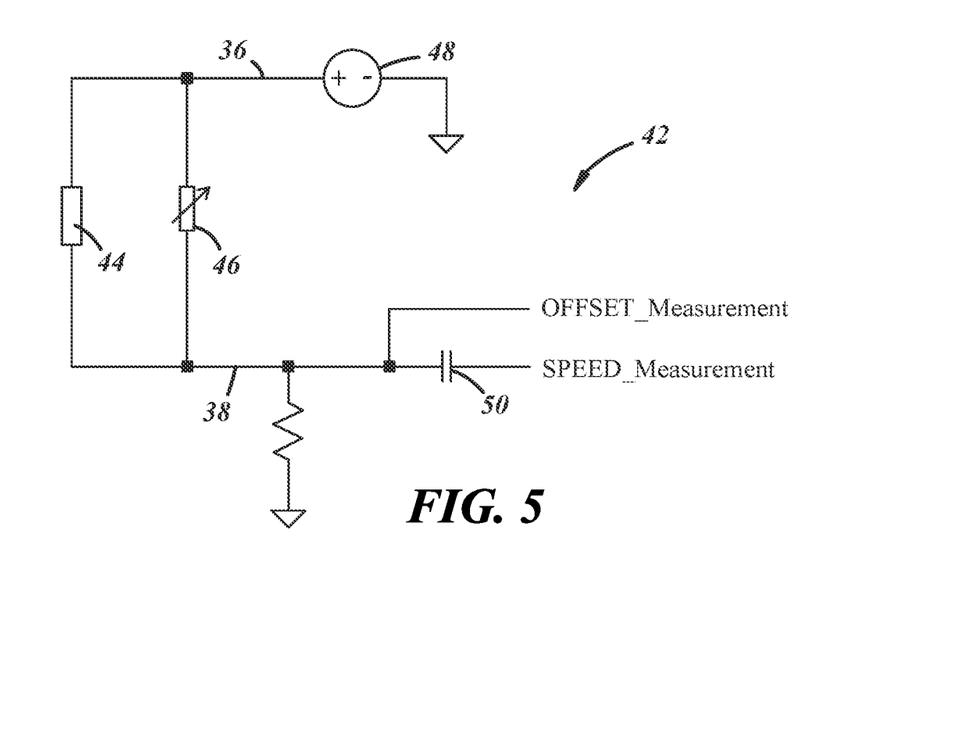
FIG. 5 is a schematic diagram of a circuit for providing information regarding a variable of interest measured by the sensor and a temperature of an operating environment for the sensor.

Referring now to FIG. 5, one embodiment of a circuit 42 for providing information regarding a variable of interest measured by the sensor assembly 20 and a temperature of an operating environment for the sensor assembly 20 is shown. The circuit 42 includes elements that form part of sensor assembly 20, such as sensor 44 and means, such as temperature varying resistor 46, for measuring a temperature of an operating environment for the sensor 44 along with elements that may be remote from sensor assembly 20 such as power source 48 and capacitor 50.

Sensor 44 is provided to measure a variable of interest and may be supported on chip 26. In the illustrated embodiment, sensor 44 comprises a wheel speed sensor configured to measure the speed of a vehicle wheel, but it should be understood that the inventions disclosed herein could be applied to sensors used in other vehicular applications, for example, a transmission speed sensor, a camshaft speed sensor, or an engine speed sensor and in non-vehicular applications. In accordance with the present teachings, sensor 44 may comprise an active wheel speed sensor. Sensor 44 may, for example, comprise a Hall effect sensor or magneto-resistive sensor. Sensor 44 is configured to receive current from an external power source such as power source 48 and is modulated as a result of changing magnetic resistance occurring in response to movement of tone wheel 18. A processing circuit, typically remote from sensor assembly 20, will ultimately generate a digital, square wave output signal responsive to the changing current in sensor 44 in which the frequency of the pulses in the signal varies in response to the speed of rotation of tone wheel 18.

Temperature varying resistor 46 is provided to indicate the temperature of the operating environment for sensor assembly 20. Temperature varying resistor 46 may comprise a thermistor or a resistance temperature detector (RTD, sometimes referred to as a "resistance thermometer"). In the illustrated embodiment, temperature varying resistor 46 comprise a positive temperature coefficient thermistor. As the temperature of the operating environment for sensor assembly 20 increases, the resistance of temperature varying resistor 46 increases. Temperature varying resistor 46 is connected between conductors 36, 38 in parallel with sensor 44. As a result, sensor assembly 20 generates an output signal that includes information regarding both a value of a variable (wheel speed in the exemplary embodiment) measured by the sensor 44 and information regarding a temperature of an operating environment for sensor 44. Because the output signal includes information regarding both variable of interest and the temperature of the operating environment, transmission of information regarding the variable of interest does not need to be interrupted to obtain temperature information despite the fact that sensor assembly only includes two conductors 36, 38. In the case of a wheel speed sensor, this eliminates the possibility that the sensor will be unable to provide wheel speed information when needed such as when an ABS event occurs. Temperature varying resistor 46 may be disposed within housing 34 and, in particular, on or within carrier 30 spaced from chip 26. It should be understood, however, that temperature varying resistor 46 may be a located anywhere along the length of conductors 36, 38. Further, although a positive temperature coefficient thermistor is shown in the illustrated embodiment, it should be understood that temperature varying resistor 46 could alternatively comprise a negative temperature coefficient thermistor in other embodiments. The thermistor may be of a type having linear relationship between temperature and resistance or of a type having a non-linear relationship between temperature and resistance. Temperature varying resistor 46 may be configured to measure temperatures in a range from negative forty (40) degrees Celsius to positive two hundred and twenty (220) degrees Celsius. In certain embodiments in which sensor 44 comprises an active wheel speed sensor, temperature varying resistor 46 is configured to activate at about positive one hundred and sixty (160) degrees Celsius or at a temperature between twenty (20) percent lesser or greater than this value.

Power source 48 generates current for use by sensor 44. Power source 48 is conventional in the art and may, for example, comprise a battery. Power source 48 may be remote from sensor assembly 20 and provide power to sensor 44 using one of conductors 36, 38.

Figure 6A:
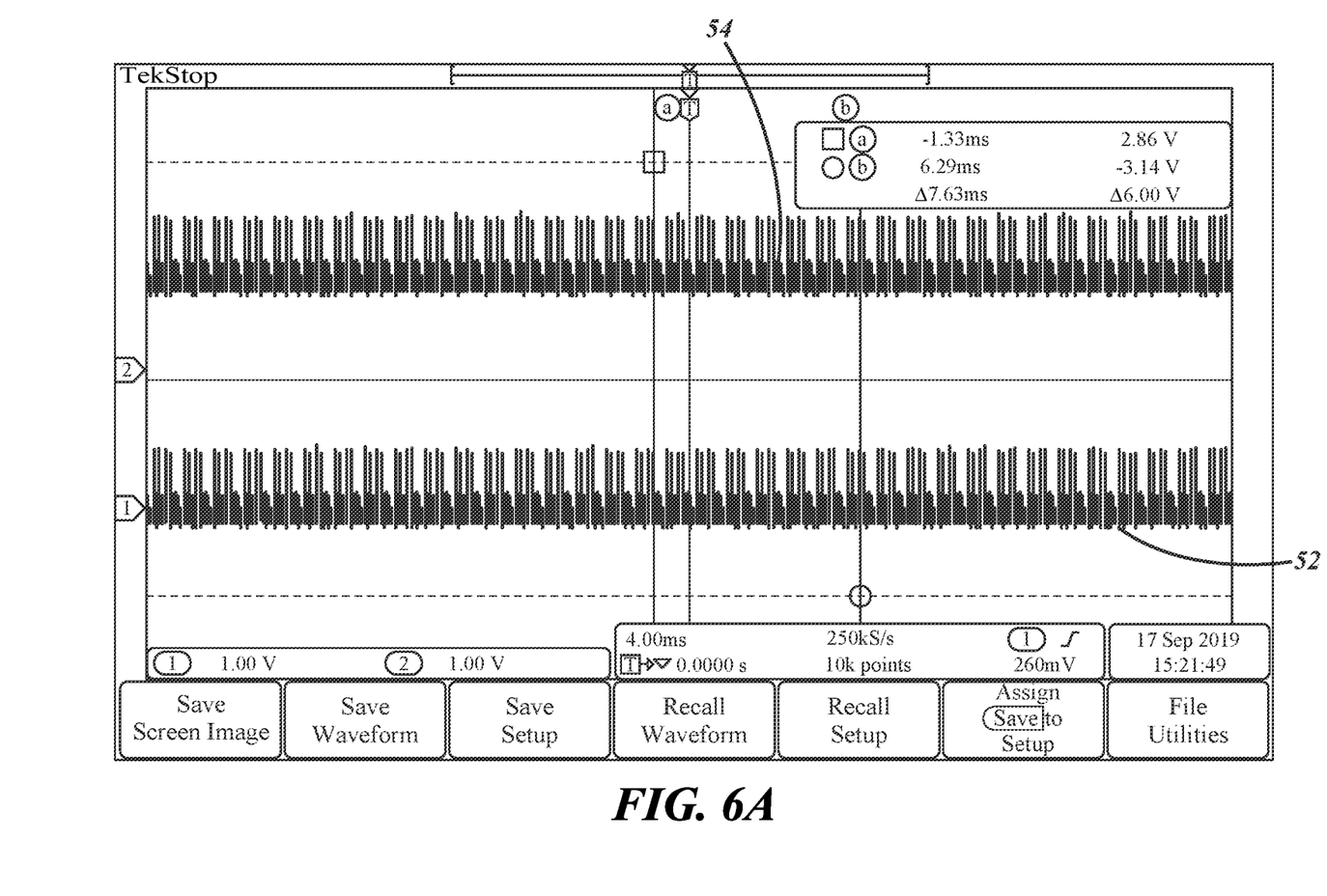
FIGS. 6A and 6B are timing diagrams illustrating measurements of a variable of interest (in this case, wheel speed) measured by the sensor and a temperature of an operating environment for the sensor.
Figure 6B:
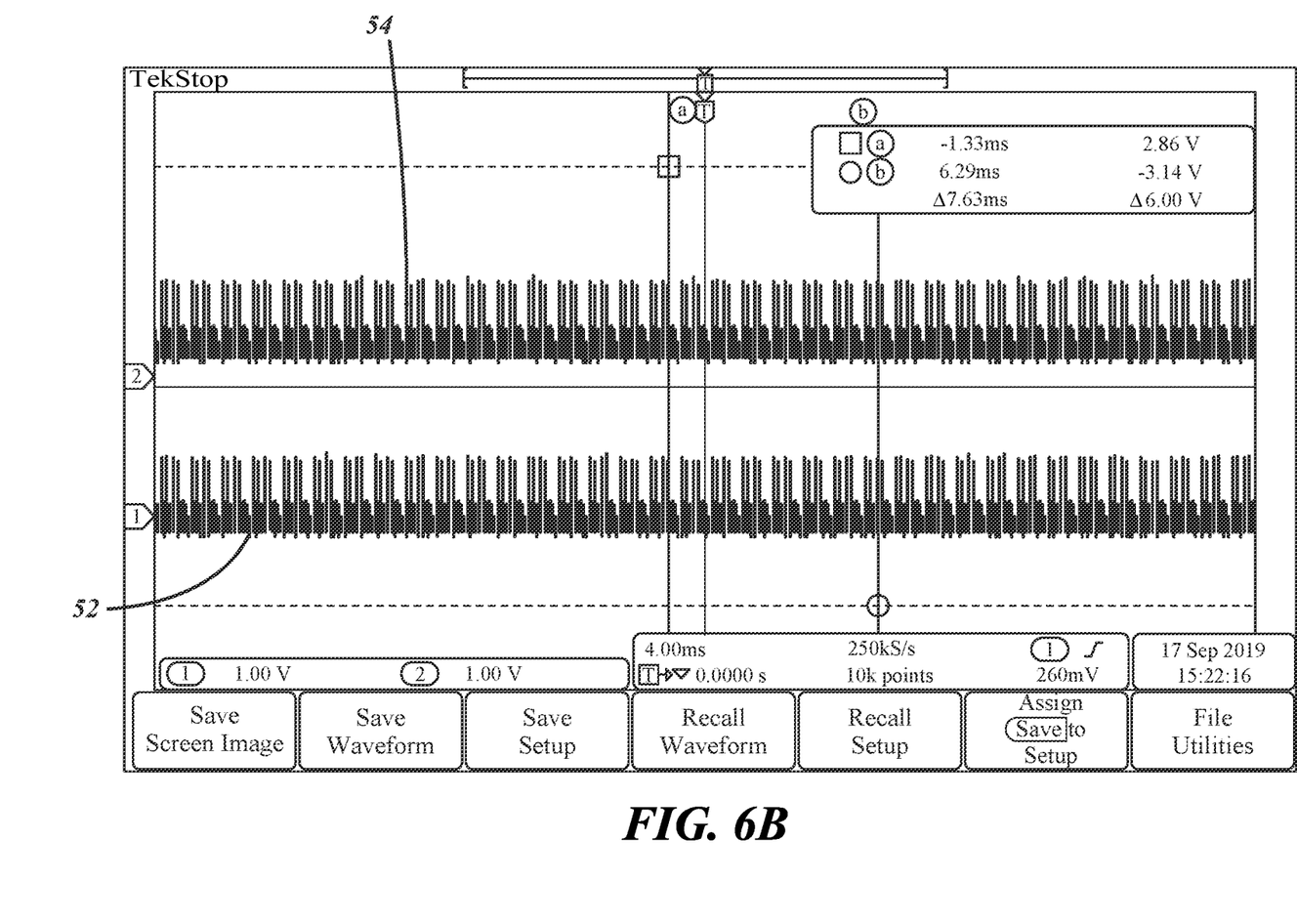

Capacitor 50 is provided for use in separating the portion of the output signal indicative of wheel speed. Capacitor 50 may be remote from sensor assembly 20. Sensor assembly 20 transmits the output signal using one of conductors 36, 38. Capacitor 50 ultimately receives the output signal, directly or indirectly, from the conductor 36 or 38 and separates the portion of the signal relating to wheel speed (or another variable of interest being measured) from the output signal to generate a sensor signal. The output signal, which includes both the wheel speed information generated by sensor 44 and the temperature information generated by temperature varying resistor 46 therefore has a voltage that is offset relative to a reference voltage which may comprise the voltage of the sensor signal. Referring to FIGS. 6A and 6B, the lower line 52 on each diagram is indicative of the voltage of the sensor signal and, therefore, wheel speed in the described embodiment. The upper line 54 on each diagram is indicative of the voltage of the output signal. The difference between, the two lines 52, 54 (i.e., the amount of the offset) is therefore indicative of the temperature of the operating environment for sensor assembly 20. In the case where temperature varying resistor 46 comprises a positive temperature coefficient thermistor, the voltage offset between the sensor signal and output signal will decrease as temperature increases and the resistance of the thermistor increases. In FIG. 6A, the offset is larger than in FIG. 6B indicating a relatively low temperature in FIG. 6A and a relatively high temperature in FIG. 6B.

A controller (not shown and of which capacitor 50 may form a part) may determine wheel speed and temperature responsive to the sensor signal and output signal. The controller may comprise the controller for the vehicle's brake control system or a separate controller and may comprise a programmable microprocessor or microcontroller or may comprise an application specific integrated circuit (ASIC). In certain embodiments, controller may include a memory, a central processing unit (CPU), and an input/output (I/O) interface including a plurality of input/output pins or terminals through which the controller may receive a plurality of input signals and transmit a plurality of output signals. The input signals may include the output signal of sensor assembly 20 (and the sensor signal if capacitor 50 is external to the controller). The output signals may include signals used for controlling various vehicle systems including braking and stability control. Where the controller forms a controller for the brake control system, for example, the output signals may include control signals for fluid control valves used to control a brake actuator for brake 16. The output signals may also include signals for the control of operator interfaces for the vehicle in order to provide information regarding vehicle speed and direction to the vehicle operator and alerts or warnings regarding the temperature to the vehicle operator.

Figure 7:
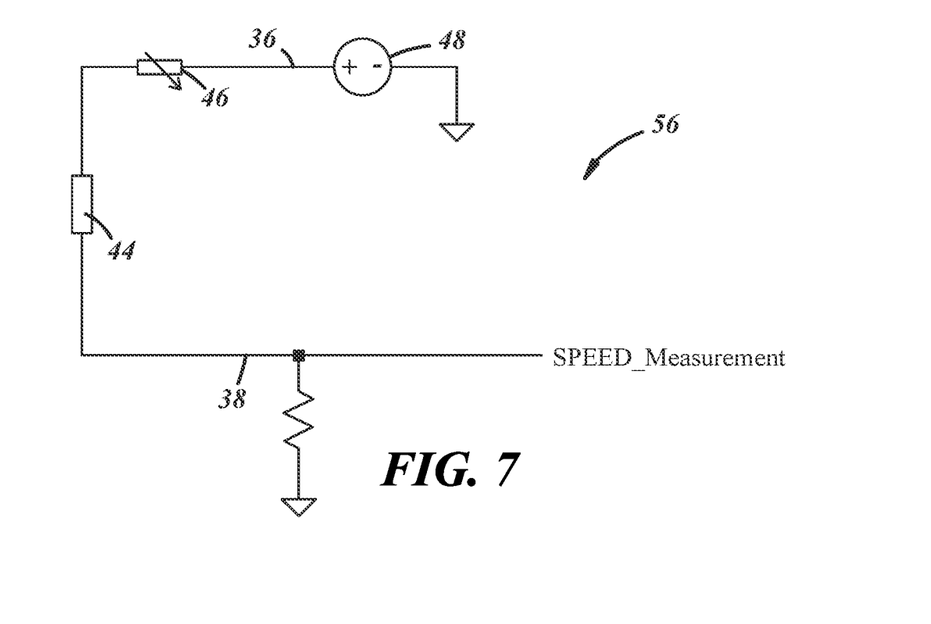
FIG. 7 is a schematic diagram of a circuit for providing information regarding a variable of interest measured by the sensor and for controlling operation of the sensor responsive to a temperature of an operating environment for the sensor.

Referring now to FIG. 7, one embodiment of a circuit 56 for providing information regarding a variable of interest measured by the sensor assembly 20 is shown. The circuit again includes elements that form part of sensor assembly 20, such as sensor 44 and temperature varying resistor 46 and elements that may be remote from sensor assembly 20 such as power source 48. In general, sensor 44, temperature varying resistor 46 and power source 48 are similar to like components in circuit 42 described hereinabove. Circuit 56 differs from circuit 42, however, in that the temperature varying resistor 46 is not used to provide information regarding the temperature of the operating environment for sensor assembly 20, but is instead used to halt operation of sensor assembly 20 when the temperature of the operating environment for sensor assembly 20 meets a predetermined condition relative to a predetermined temperature (e.g., exceeds the predetermined temperature). Temperature varying resistor 46 is therefore arranged in series with sensor 44 in circuit 56 as opposed to being in parallel with sensor 44 as in circuit 42. As discussed above, the resistance of temperature varying resistor 46 is related to the temperature of the operating environment for sensor assembly 20. In the case of a positive temperature coefficient thermistor, increasing temperatures will result in increasing resistance and reduce current flow to sensor 44 from power source 48. Ultimately, if the temperature of the operating environment exceeds a predetermined temperature, temperature varying resistor 46 will prevent further current flow to sensor 44. Temperature varying resistor 46 will reset once the temperature of the operating environment falls below the predetermined temperature to allow sensor 44 to resume operation.

A sensor assembly 20 in accordance with present teachings represents an improvement as compared to conventional sensor assemblies. Because the sensor assembly 20 is capable of determining the temperature of the operating environment of the sensor, the sensor assembly 20 facilitates the use of active sensors in applications in which passive sensors have limitations, but in which the potential for relatively high temperatures might otherwise preclude the use of active sensors. In addition, and unlike conventional sensors with temperature sensing capabilities, the sensor assembly 20 enables the transmission and use of temperature information without the need for additional wires or other controller hardware. Further, the sensor assembly 20 enables the transmission of temperature information without interrupting the transmission of information regarding the variable being measured by the primary sensor.

While the invention has been shown and described with reference to one or more particular embodiments thereof, it will be understood by those of skill in the art that various changes and modifications can be made without departing from the spirit and scope of the invention.

What is claimed is:

1. A sensor assembly, comprising:
  a sensor; and,
  a temperature varying resistor in parallel with the sensor;
  wherein the sensor assembly includes only first and second conductors, the first conductor configured to transmit current, without any superimposed signal, from a direct current power source generating a constant voltage and the second conductor configured to transmit an output signal, the sensor and the temperature varying resistor in parallel between the first and second conductors and the output signal of the sensor assembly including information regarding a value of a variable measured by the sensor and information regarding a temperature of an operating environment for the sensor.

2. The sensor assembly of claim 1 wherein the sensor comprises an active sensor.

3. The sensor assembly of claim 1 wherein a voltage of the output signal is offset from a reference voltage and an amount of the offset is indicative of the temperature.

4. The sensor assembly of claim 3 wherein the reference voltage comprises a voltage of a sensor signal generated in response to the output signal and indicative of the value of the variable measured by the sensor.

5. The sensor assembly of claim 1 wherein the sensor comprises an active wheel speed sensor and the variable comprises a speed of a wheel.

6. The sensor assembly of claim 5 wherein the wheel comprises a vehicle wheel.

7. The sensor assembly of claim 1 wherein the sensor assembly includes a housing configured to enclose the sensor and the temperature varying resistor is disposed within the housing.

8. The sensor assembly of claim 1 wherein the power source comprises a battery.

9. A sensor assembly, comprising:
  a sensor; and,
  means, in parallel with the sensor, for measuring a temperature of an operating environment for the sensor;
  wherein the sensor assembly includes only first and second conductors, the first conductor configured to transmit current, without any superimposed signal, from a direct current power source generating a constant voltage and the second conductor configured to transmit an output signal, the sensor and the measuring means in parallel between the first and second conductors and the output signal of the sensor assembly including information regarding a value of a variable measured by the sensor and information regarding a temperature of an operating environment for the sensor.

10. The sensor assembly of claim 9 wherein the sensor comprises an active sensor.

11. The sensor assembly of claim 9 wherein a voltage of the output signal is offset from a reference voltage and an amount of the offset is indicative of the temperature.

12. The sensor assembly of claim 11 wherein the reference voltage comprises a voltage of a sensor signal generated in response to the output signal and indicative of the value of the variable measured by the sensor.

13. The sensor assembly of claim 9 wherein the sensor comprises an active wheel speed sensor and the variable comprises a speed of a wheel.

14. The sensor assembly of claim 13 wherein the wheel comprises a vehicle wheel.

15. The sensor assembly of claim 9 wherein the sensor assembly includes a housing configured to enclose the sensor and the measuring means is disposed within the housing.

16. A sensor assembly, comprising:
a sensor; and,
a temperature varying resistor in series with the sensor
wherein the sensor assembly includes only first and second conductors, the first conductor configured to transmit current from a power source and the second conductor configured to transmit an output signal, the sensor and the temperature varying resistor in series between the first and second conductors and the output signal of the sensor assembly including information regarding a value of a variable measured by the sensor and the temperature varying resistor preventing delivery of current to the sensor from the power source when a temperature of the operating environment for the sensor meets a predetermined condition relative to a predetermined temperature,
wherein the sensor comprises an active wheel speed sensor and the variable comprises a speed of a wheel.

17. The sensor assembly of claim 16 wherein the wheel comprises a vehicle wheel.

18. The sensor assembly of claim 16 wherein the sensor assembly includes a housing configured to enclose the sensor and the temperature varying resistor is disposed within the housing.

* * * * *